(12) United States Patent
Fujiwara

(10) Patent No.: US 8,088,508 B2
(45) Date of Patent: Jan. 3, 2012

(54) THERMAL BATTERY

(75) Inventor: Syozo Fujiwara, Neyagawa (JP)

(73) Assignee: Panasonic Corporation, Osaka (JP)

( * ) Notice: Subject to any disclaimer, the term of this patent is extended or adjusted under 35 U.S.C. 154(b) by 1111 days.

(21) Appl. No.: 11/340,612

(22) Filed: Jan. 27, 2006

(65) Prior Publication Data

US 2006/0127770 A1   Jun. 15, 2006

(30) Foreign Application Priority Data

Jan. 31, 2005   (JP) ................. 2005-022428

(51) Int. Cl.
*H01M 6/36* (2006.01)
*H01M 4/58* (2006.01)

(52) U.S. Cl. ................. 429/112; 429/218.1; 429/231.1; 429/231.5

(58) Field of Classification Search ............... 429/218.1, 429/231.5, 112, 231.1
See application file for complete search history.

(56) References Cited

U.S. PATENT DOCUMENTS 4,009,052 A * 2/1977 Whittingham ................. 429/304
6,376,127 B1 * 4/2002 Teranishi et al. .......... 429/231.1

FOREIGN PATENT DOCUMENTS

| JP | 4280070 | 10/1992 |
|---|---|---|
| JP | 4280071 | 10/1992 |
| JP | 5242896 | 9/1993 |
| JP | 08-106912 | * 4/1996 |

* cited by examiner

*Primary Examiner* — Helen O Conley
(74) *Attorney, Agent, or Firm* — Dickinson Wright PLLC

(57) ABSTRACT

A thermal battery includes a plurality of unit cells. Each unit cell includes a cathode, an anode, and an electrolyte disposed between the cathode and the anode. The electrolyte includes a salt molten at the thermal battery operating temperatures. The cathode includes a titanium-containing sulfide as an active material.

7 Claims, 2 Drawing Sheets

F I G. 2
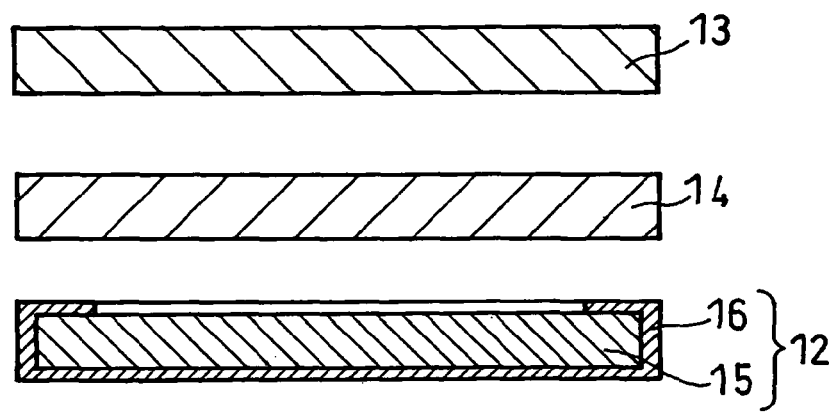

THERMAL BATTERY

BACKGROUND OF THE INVENTION

Generally, a thermal battery includes a plurality of unit cells. Each unit cell comprises an anode, a cathode, and an electrolyte interposed between the anode and the cathode. For the electrolyte, a salt molten at high temperatures is employed. At ambient temperature, this electrolyte is not ion-conductive, and therefore the thermal battery is in inactive state. When heat is applied to the unit cell to give high temperatures, the electrolyte will be in molten state and becomes an excellent ion-conductor, thereby bringing the thermal battery into active state and enabling a supply of electricity to the outside electric devices.

Thermal battery is a kind of reserve battery. The battery reaction is not advanced unless the electrolyte melts. Thus, even after 5 to 10 years or more of storage, the battery performance same as the performance right after its manufacture can be achieved. The electrode reaction of the thermal battery advances at high temperatures. Thus, the electrode reactions advance far more rapidly compared with other batteries using an aqueous solution electrolyte, an organic electrolyte, and the like. Therefore, thermal batteries have excellent discharge characteristics under high load. Further, thermal batteries are advantageous in that electricity becomes available in a short period of time, within a second, when an activation signal is sent to the battery at usage, though the period of time varies depending upon the heating method. Thus, based on these advantageous characteristics, thermal batteries are suitably used as a power source for various ordnance devices such as a guidance system, or as an emergency power source.

To improve the above characteristics, there has been examined various thermal batteries in which iron disulfide is used as a cathode active material. To improve the characteristics of such cathode active material, there has been proposed in Japanese Laid-Open Patent Publication No. Hei 5-242896 to use a composite material of iron disulfide and iridium disulfide (iridium content: 5 to 20 wt %) for the cathode active material, for example. In the specification of Japanese Patent No. 2847982, there has been proposed to use a composite material of iron disulfide and titanium disulfide (titanium content: 5 to 20 wt %) for the cathode active material. In the specification of Japanese Patent No. 2847983, there has been proposed to use a composite material of iron disulfide and vanadium disulfide (vanadium content: 5 to 20 wt %) for the cathode active material.

The voltage of a unit cell under a practical range of current density (approximately 0.5 to 2 A/cm$^2$) for a general thermal battery in which iron disulfide is used for the cathode active material and lithium metal is used for the anode active material is about 1.8 to 2 V. In many cases, thermal batteries are used as a power source for devices which necessitate a high output and a high load, i.e., several tens to hundreds of volts. Therefore, a stack has to be formed by stacking a plurality of unit cells and connecting the stacked cells electrically in series, to obtain the required voltage.

Recently, with the devices becoming smaller in size and better in performance, excellent discharge performance under high load is required for thermal batteries, i.e., high voltages have to be maintained at a large current discharge of 1 to 2 A/cm$^2$ or more. Additionally, a decrease in the height of the stack, i.e. the height of the thermal battery is required, by increasing the voltage of the unit cell and reducing the number of the unit cell to be used.

When a thermal battery is discharged at a current density of about 0.5 A/cm$^2$, the voltage of a unit cell in which the above composite materials including iron disulfide are used for the cathode active material is about 2.1 V, i.e., larger than the voltage of a unit cell in which iron disulfide alone is used for the cathode active material (approximately 1.8 V). Therefore, the height of a thermal battery can be decreased.

However, when a thermal battery is discharged at a current density of 1 to 2 A/cm$^2$, i.e., when a large current discharge is carried out, the voltages of the above unit cell in which the composite materials including iron disulfide are used are about 1.7 to 1.9 V, about 1.6 to 1.9 V, and about 1.6 to 1.8 V, respectively, while the voltage of the unit cell in which iron disulfide alone is used for the cathode active material is about 1.6 to 1.8 V. Thus, when the large current discharge is carried out, there is no significant difference in the voltage between the unit cell in which the above composite materials including iron disulfide are used for the cathode active material and the unit cell in which iron disulfide alone is used for the cathode active material. That is, the effect of a high discharge voltage will be insignificant.

Therefore, to solve the above conventional problems, the present invention aims to provide a thermal battery with excellent discharge performance under high load, by increasing the voltage at a large current discharge.

BRIEF SUMMARY OF THE INVENTION

The thermal battery of the present invention includes a plurality of unit cells. Each unit cell comprises a cathode, an anode, and an electrolyte interposed between the cathode and the anode, the electrolyte comprising a salt molten at the thermal battery operating temperatures. The thermal battery of the present invention is characterized in that the cathode comprises a titanium-containing sulfide as an active material.

Preferably, the titanium-containing sulfide is a compound represented by the general formula:

$$Ti_{1-\alpha}M_\alpha S_x,$$

where M is at least one selected from the group consisting of Cr, Mn, Co, Ni, Cu, Zn, Ge, Zr, Nb, Mo, Ag, Cd, Sn, and W, and $\alpha$ and x satisfy $0 \leq \alpha \leq 0.95$ and $1.5 \leq x \leq 2.75$, respectively.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 2 is an exploded cross sectional view of a unit cell used in the thermal battery in FIG. 1.

DETAILED DESCRIPTION OF THE INVENTION

Figure 1:
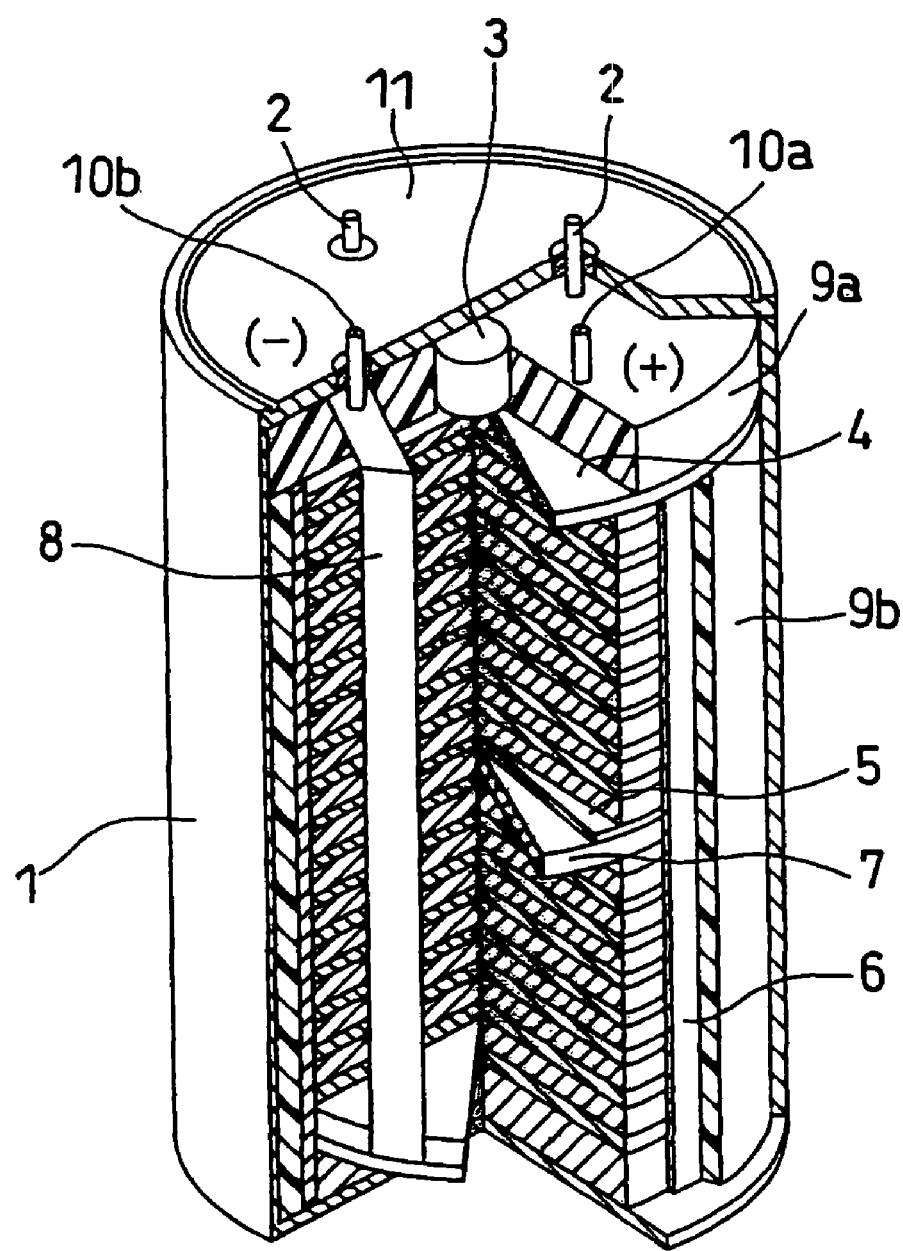
FIG. 1 is a perspective view showing partially cutaway cross sections of a thermal battery of an embodiment of the present invention.

The present invention relates to a thermal battery including a plurality of unit cells. Each unit cell comprises a cathode, an anode, and an electrolyte disposed between the cathode and the anode, the electrolyte comprising a salt molten at the thermal battery operating temperatures (a molten salt). In other words, the electrolyte is inactive at ambient temperature but is activated by melting at a predetermined temperature when the thermal battery is operated. The thermal battery is characterized in that the cathode comprises a titanium-containing sulfide as an active material.

By using the titanium-containing sulfide for the cathode active material, the reactivity of cathode improves. Additionally, since the titanium-containing sulfide as a cathode active material for a thermal battery of the present invention has a high equilibrium potential and a small overpotential at a discharge in cathode compared with iron disulfide, which is a conventional cathode active material for thermal batteries, a discharge potential of cathode becomes higher. Therefore, the discharge voltage of a unit cell or a thermal battery increases.

Thus, even at a large current discharge, a high voltage can be maintained, and excellent discharge performance under high load can be obtained. Additionally, without damaging the discharge performance under high load, a thermal battery for a high-load discharge can be made smaller by reducing the number of the unit cell.

The titanium-containing sulfide is a compound represented by the general formula: $Ti_{1-\alpha}M_{\alpha}S_x$, for example. Preferably, M is at least one element selected from the group consisting of Cr, Mn, Co, Ni, Cu, Zn, Ge, Zr, Nb, Mo, Ag, Cd, Sn, and W, and $\alpha$ and x satisfy $0 \leq \alpha \leq 0.95$ and $1.5 \leq x \leq 2.75$, respectively.

"$\alpha$" represents the amount of the substituted element M, and "x" shows a deviation from the stoichiometric composition. By substituting a part of titanium by the element M in the region that "$\alpha$" is 0.95 or below, the discharge voltage further increases. When x<1.5, or 2.75<x, the discharge voltage lowers slightly.

"x" is further preferably 1.75 to 2.25, since the plateau of the discharge voltage can be maintained based on the improvement of crystallinity and the like. "$\alpha$" is further preferably 0.25 to 0.75, since the plateau of the discharge voltage can be maintained, based on the improvement of crystallinity and the like.

Co is particularly preferable for the element M, in the sense that a high discharge voltage can be obtained. This is probably due to the fact that Co easily and homogenously diffuses into the solid phase in Ti, which improves the homogeneity of the crystal to easily bring out the effects of the substitution by the element M.

The titanium-containing sulfide may be obtained by mixing titanium powders, sulfur powders, and powders of the element M in a ball mill and the like, and then baking the mixture, for example.

An embodiment of a thermal battery of the present invention is described by referring to FIG. 1.

In FIG. 1, a power-generating portion, in which a plurality of unit cells 7 and heating agents 5 are alternately stacked, is stored in a metal-made outer case 1. On top of the power-generating portion, an ignition pad 4 is disposed, and in the proximity of the top of the ignition pad 4, an igniter 3 is disposed. Along the circumference of the power-generating portion, a fuse wrap 6 is disposed. The heating agent 5 includes iron powders and is conductive. Thus, the unit cells 7 are electrically connected in series via the heating agents 5. The heating agent 5 comprises a mixture of Fe and $KClO_4$, for example, and since Fe powders are sintered at the time of the battery activation along with the combustion of the heating agent 5, the conductivity of the heating agent 5 is maintained, from the start of discharge (the start of combustion) to the termination of discharge (the termination of combustion).

The outer case 1 is sealed by a battery lid 11 having a pair of ignition terminals 2, a positive terminal 10a, and a negative terminal 10b. The positive terminal 10a is connected to the uppermost cathode of the unit cell 7 in the power-generating portion, via a cathode lead plate. On the other hand, the negative terminal 10b is connected to the lowermost anode of the unit cell 7 in the power-generating portion, via an anode lead plate 8. Between the battery lid 11 and the ignition pad 4, a thermal insulating material 9a is disposed, and between the outer case 1 and the power-generating portion, a thermal insulating material 9b is filled.

As shown in FIG. 2, the unit cell 7 comprises an anode 12, a cathode 13, and an electrolyte 14 disposed between the anode 12 and the cathode 13.

The cathode 13 comprises a mixture of the above titanium-containing sulfide powders, a binder such as silica powders, and a salt to be used for the electrolyte 14 mentioned later, for example. The salt is used to improve ion conductivity.

The anode 12 comprises an anode material mixture layer 15 including an anode active material, and an iron-made cup-like current collector 16 housing the anode material mixture layer 15. The anode material mixture layer 15 comprises a mixture of an anode active material and a conductive material, for example. For the anode active material, a Li metal, and a lithium-containing compound including Li—Al alloy, Li—Si alloy and the like are used, for example. For the conductive material, metal powders of iron, copper, nickel, manganese, and the like or a carbon material is used, for example. Additionally, the anode material mixture layer 15 may include a salt to be used for the electrolyte 14 mentioned later, to improve ion conductivity.

The electrolyte 14 comprises a mixture of a salt molten at the thermal battery operating temperatures (high temperatures), and a retainer such as MgO, for example. Any salt usable for a thermal battery, such as an alkaline metal salt, a mixture of salts, or a eutectic salt, may be used. For example, an alkaline salt such as LiCl, KCl, or $AlCl_3$, or a eutectic salt such as LiCl—KCl, LiCl—LiBr—LiF, LiCl—LiBr—KBr, or $LiNO_3$—$KNO_3$ may be used.

The operation of the above thermal battery is described below.

From a power source connected to the ignition terminal 2, a high voltage is applied to the ignition terminal 2 to fire the igniter 3. The combustion is transferred to the ignition pad 4 and a fuse wrap 6, to combust the heating agent 5 to heat the unit cell 7. Then, the electrolyte 14 of the unit cell 7 melts to become a molten salt, i.e. an ion-conductor. The battery is thus activated to enable discharge.

Although the above-described is an internally-heated thermal battery, in which an igniter is provided inside of the battery and the battery is activated by heating the power-generating portion from inside of the battery, the present invention can be applied to an externally-heated thermal battery as well, in which an igniter is not provided inside of the battery and the battery is activated by heating the power-generating portion with a heater such as a burner from outside of the battery.

Although Examples of the present invention are described in detail in the following, the present invention is not limited to these Examples.

Example 1

A unit cell of FIG. 2 was prepared as described below. The preparation of the unit cell was all carried out in an environment of dry air with the dew point of −45° C. or below, where influences from moisture were eliminated to the maximum.
(1) Preparation of Cathode Active Material Titanium powders and sulfur powders were mixed together in a porcelain ball mill in an atomic ratio of 1:2. The obtained mixture was baked in a porcelain crucible for 3 hours at about 450° C. by heating, to obtain a baked product of $TiS_2$. The baked product was ground in a porcelain ball mill and classified to give a size of 200 mesh or below, thereby obtaining $TiS_2$ powders as a cathode active material.

(2) Preparation of Cathode $TiS_2$ powders obtained in the above, LiCl—KCl as a eutectic salt, and silica powders as a retainer were mixed in a weight ratio of 240:110:7 in a porcelain ball mill. The mixture was baked at 450° C. for 1 hour in an argon gas atmosphere. Subsequently, the baked product was ground in a porcelain ball mill and classified to give a size of 200 mesh or below, thereby obtaining a cathode material mixture. The cathode material mixture was pressure-molded by a pressure of 2 tons/cm$^2$, to give a disk-like form with a diameter of 13 mm and a thickness of 0.4 mm, thereby obtaining a cathode 13.

(3) Preparation of Unit Cell

An electrolyte 14 was obtained by mixing LiCl—KCl as a eutectic salt and MgO as a retainer with a weight ratio of 60:40, and by pressure-molding the obtained mixture with a pressure of 2 tons/cm$^2$ to give a disk form with a diameter of 13 mm and a thickness of 0.4 mm.

An anode 12 was prepared as in below.

An anode material mixture layer 15 comprising a disk-like Li foil with a diameter of 11 mm and a thickness of 0.7 mm was placed into a cup-like current collector 16 made of stainless steel SUS304, and opening end of the current collector 16 were bent inwardly to crimp the peripheral portion of the anode material mixture layer 15, to clamp the anode material mixture layer 15 between the bent portion and the bottom portion of the current collector 16. The anode material mixture layer 15 was thus fixed inside of the current collector 16, thereby obtaining the anode 12 with a diameter of 13 mm and a thickness of 1.2 mm.

The unit cell was obtained by stacking the above-obtained cathode 13 and anode 12 with the electrolyte 14 interposed therebetween.

Examples 2-7

Titanium powders and sulfur powders were mixed together in a porcelain ball mill in an atomic ratio of 1:x. The obtained mixture was baked in a porcelain crucible for 3 hours at about 450° C. by heating, to obtain a baked product of $TiS_x$. The baked product was ground in a porcelain ball mill and classified to give a size of 200 mesh or below, thereby obtaining $TiS_x$ powders as a cathode active material.

Herein, the value of "x" in $TiS_x$ was changed variously as shown in Table 1, in preparation of the cathode active material. Then, a unit cell was prepared in the same manner as Example 1, respectively, by using these cathode active materials.

TABLE 1

| | Cathode Active Material: $Ti_{1-\alpha}M_\alpha S_x$ | | Discharge Voltage (V) | | | |
|---|---|---|---|---|---|---|
| | Element M | α | x | 0.5 A/cm$^2$ | 1 A/cm$^2$ | 1.5 A/cm$^2$ | 2 A/cm$^2$ |
| Ex. 1 | — | 0 | 2 | 2.25 | 2.17 | 2.11 | 2.05 |
| Ex. 2 | — | 0 | 1.2 | 2.22 | 2.14 | 2.07 | 2.02 |
| Ex. 3 | — | 0 | 1.5 | 2.23 | 2.15 | 2.09 | 2.03 |
| Ex. 4 | — | 0 | 1.83 | 2.24 | 2.17 | 2.10 | 2.05 |
| Ex. 5 | — | 0 | 2.25 | 2.24 | 2.16 | 2.10 | 2.05 |
| Ex. 6 | — | 0 | 2.75 | 2.23 | 2.15 | 2.08 | 2.03 |
| Ex. 7 | — | 0 | 3 | 2.20 | 2.12 | 2.06 | 2.01 |

Examples 8-69

Titanium powders, powders of element M, and sulfur powders were mixed together in a porcelain ball mill in an atomic ratio of 1-α:α:x. The obtained mixture was baked in a porcelain crucible for 3 hours at about 450° C. by heating, to obtain a baked product of $Ti_{1-\alpha}M_\alpha S_x$. The baked product was ground in a porcelain ball mill and classified to give a size of 200 mesh or below, thereby obtaining $Ti_{1-\alpha}M_\alpha S_x$ powders as a cathode active material.

Herein, the value of "α", the value of "x", and the element M in $Ti_{1-\alpha}M_\alpha S_x$ were changed variously as shown in Tables 2 to 5, to prepare the cathode active material. Then, a unit cell was prepared in the same manner as Example 1, respectively, by using these cathode active materials.

TABLE 2

| | Cathode active material: $Ti_{1-\alpha}M_\alpha S_x$ | | | Discharge Voltage (V) | | | |
|---|---|---|---|---|---|---|---|
| | Element M | α | X | 0.5 A/cm$^2$ | 1 A/cm$^2$ | 1.5 A/cm$^2$ | 2 A/cm$^2$ |
| Ex. 8 | Cr | 0.05 | 2 | 2.30 | 2.22 | 2.16 | 2.11 |
| Ex. 9 | Cr | 0.5 | 2 | 2.35 | 2.27 | 2.19 | 2.13 |
| Ex. 10 | Cr | 0.95 | 2 | 2.33 | 2.23 | 2.13 | 2.05 |
| Ex. 11 | Cr | 0.98 | 2 | 2.32 | 2.20 | 2.10 | 2.01 |
| Ex. 12 | Mn | 0.05 | 2 | 2.25 | 2.22 | 2.19 | 2.16 |
| Ex. 13 | Mn | 0.5 | 2 | 2.28 | 2.24 | 2.20 | 2.15 |
| Ex. 14 | Mn | 0.95 | 2 | 2.28 | 2.22 | 2.16 | 2.09 |
| Ex. 15 | Mn | 0.98 | 2 | 2.28 | 2.18 | 2.09 | 2.01 |
| Ex. 16 | Co | 0.05 | 1.5 | 2.26 | 2.22 | 2.19 | 2.13 |
| Ex. 17 | Co | 0.05 | 2 | 2.29 | 2.26 | 2.23 | 2.20 |
| Ex. 18 | Co | 0.05 | 2.75 | 2.26 | 2.21 | 2.17 | 2.13 |
| Ex. 19 | Co | 0.5 | 1.5 | 2.31 | 2.27 | 2.23 | 2.19 |
| Ex. 20 | Co | 0.5 | 2 | 2.32 | 2.29 | 2.26 | 2.23 |
| Ex. 21 | Co | 0.5 | 2.75 | 2.30 | 2.25 | 2.20 | 2.14 |
| Ex. 22 | Co | 0.95 | 1.5 | 2.27 | 2.24 | 2.21 | 2.18 |
| Ex. 23 | Co | 0.95 | 2 | 2.28 | 2.25 | 2.22 | 2.19 |
| Ex. 24 | Co | 0.95 | 2.75 | 2.25 | 2.21 | 2.18 | 2.15 |
| Ex. 25 | Co | 0.98 | 2 | 2.26 | 2.21 | 2.16 | 2.11 |

TABLE 3

| | Cathode Active Material: $Ti_{1-\alpha}M_\alpha S_x$ | | | Discharge Voltage (V) | | | |
|---|---|---|---|---|---|---|---|
| | Element M | α | X | 0.5 A/cm$^2$ | 1 A/cm$^2$ | 1.5 A/cm$^2$ | 2 A/cm$^2$ |
| Ex. 26 | Ni | 0.05 | 2 | 2.26 | 2.19 | 2.14 | 2.09 |
| Ex. 27 | Ni | 0.5 | 2 | 2.31 | 2.23 | 2.17 | 2.12 |
| Ex. 28 | Ni | 0.95 | 2 | 2.30 | 2.21 | 2.15 | 2.10 |
| Ex. 29 | Ni | 0.98 | 2 | 2.29 | 2.19 | 2.10 | 2.02 |
| Ex. 30 | Cu | 0.05 | 2 | 2.27 | 2.20 | 2.15 | 2.10 |
| Ex. 31 | Cu | 0.5 | 2 | 2.33 | 2.26 | 2.20 | 2.14 |
| Ex. 32 | Cu | 0.95 | 2 | 2.34 | 2.25 | 2.18 | 2.12 |
| Ex. 33 | Cu | 0.98 | 2 | 2.33 | 2.22 | 2.11 | 2.01 |
| Ex. 34 | Zn | 0.05 | 2 | 2.26 | 2.21 | 2.16 | 2.11 |
| Ex. 35 | Zn | 0.5 | 2 | 2.27 | 2.22 | 2.17 | 2.12 |
| Ex. 36 | Zn | 0.95 | 2 | 2.29 | 2.22 | 2.15 | 2.09 |
| Ex. 37 | Zn | 0.98 | 2 | 2.28 | 2.18 | 2.10 | 2.02 |

TABLE 4

| | Cathode Active Material: $Ti_{1-\alpha}M_\alpha S_x$ | | | Discharge Voltage (V) | | | |
|---|---|---|---|---|---|---|---|
| | Element M | α | X | 0.5 A/cm$^2$ | 1 A/cm$^2$ | 1.5 A/cm$^2$ | 2 A/cm$^2$ |
| Ex. 38 | Ge | 0.05 | 2 | 2.28 | 2.22 | 2.16 | 2.11 |

TABLE 4-continued

| | Cathode Active Material: $Ti_{1-\alpha}M_\alpha S_x$ | | | Discharge Voltage (V) | | | |
|---|---|---|---|---|---|---|---|
| | | | | 0.5 | 1 | 1.5 | 2 |
| | Element M | α | X | A/cm² | A/cm² | A/cm² | A/cm² |
| Ex. 39 | Ge | 0.5 | 2 | 2.38 | 2.31 | 2.26 | 2.20 |
| Ex. 40 | Ge | 0.95 | 2 | 2.37 | 2.28 | 2.22 | 2.15 |
| Ex. 41 | Ge | 0.98 | 2 | 2.34 | 2.19 | 2.08 | 1.98 |
| Ex. 42 | Zr | 0.05 | 2 | 2.27 | 2.21 | 2.16 | 2.11 |
| Ex. 43 | Zr | 0.5 | 2 | 2.38 | 2.29 | 2.21 | 2.15 |
| Ex. 44 | Zr | 0.95 | 2 | 2.33 | 2.25 | 2.18 | 2.12 |
| Ex. 45 | Zr | 0.98 | 2 | 2.31 | 2.21 | 2.12 | 2.03 |
| Ex. 46 | Nb | 0.05 | 2 | 2.26 | 2.19 | 2.12 | 2.06 |
| Ex. 47 | Nb | 0.5 | 2 | 2.29 | 2.21 | 2.14 | 2.08 |
| Ex. 48 | Nb | 0.95 | 2 | 2.28 | 2.19 | 2.11 | 2.05 |
| Ex. 49 | Nb | 0.98 | 2 | 2.27 | 2.15 | 2.05 | 1.95 |
| Ex. 50 | Mo | 0.05 | 2 | 2.31 | 2.24 | 2.18 | 2.14 |
| Ex. 51 | Mo | 0.5 | 2 | 2.34 | 2.28 | 2.23 | 2.19 |
| Ex. 52 | Mo | 0.95 | 2 | 2.36 | 2.23 | 2.14 | 2.08 |
| Ex. 53 | Mo | 0.98 | 2 | 2.34 | 2.19 | 2.06 | 1.96 |

TABLE 5

| | Cathode Active Material: $Ti_{1-\alpha}M_\alpha S_x$ | | | Discharge Voltage (V) | | | |
|---|---|---|---|---|---|---|---|
| | | | | 0.5 | 1 | 1.5 | 2 |
| | Element M | α | X | A/cm² | A/cm² | A/cm² | A/cm² |
| Ex. 54 | Ag | 0.05 | 2 | 2.26 | 2.20 | 2.14 | 2.09 |
| Ex. 55 | Ag | 0.5 | 2 | 2.30 | 2.23 | 2.17 | 2.13 |
| Ex. 56 | Ag | 0.95 | 2 | 2.29 | 2.21 | 2.14 | 2.08 |
| Ex. 57 | Ag | 0.98 | 2 | 2.28 | 2.18 | 2.10 | 2.02 |
| Ex. 58 | Cd | 0.05 | 2 | 2.26 | 2.20 | 2.14 | 2.08 |
| Ex. 59 | Cd | 0.5 | 2 | 2.28 | 2.20 | 2.14 | 2.08 |
| Ex. 60 | Cd | 0.95 | 2 | 2.30 | 2.21 | 2.14 | 2.07 |
| Ex. 61 | Cd | 0.98 | 2 | 2.29 | 2.18 | 2.09 | 2.01 |
| Ex. 62 | Sn | 0.05 | 2 | 2.26 | 2.18 | 2.12 | 2.06 |
| Ex. 63 | Sn | 0.5 | 2 | 2.29 | 2.20 | 2.13 | 2.06 |
| Ex. 64 | Sn | 0.95 | 2 | 2.31 | 2.22 | 2.13 | 2.06 |
| Ex. 65 | Sn | 0.98 | 2 | 2.30 | 2.19 | 2.09 | 1.99 |
| Ex. 66 | W | 0.05 | 2 | 2.28 | 2.22 | 2.18 | 2.13 |
| Ex. 67 | W | 0.5 | 2 | 2.32 | 2.25 | 2.18 | 2.12 |
| Ex. 68 | W | 0.95 | 2 | 2.33 | 2.22 | 2.13 | 2.07 |
| Ex. 69 | W | 0.98 | 2 | 2.32 | 2.18 | 2.04 | 1.92 |

Comparative Example 1

Iron powders and sulfur powders were mixed together in a porcelain ball mill in an atomic ratio of 1:2. The obtained mixture was baked in a porcelain crucible for 3 hours at about 450° C. by heating, to obtain a baked product of $FeS_2$. The baked product was ground in a porcelain ball mill and classified to give a size of 200 mesh or below, thereby obtaining $FeS_2$ powders as a cathode active material. A unit cell was prepared in the same manner as Example 1 by using this cathode active material.

Comparative Example 2

Sulfur powders, iron powders, and iridium powders were mixed together in a weight ratio of 53.4:36.6:10. The obtained mixture was baked in a porcelain crucible for 3 hours at about 450° C. by heating. The baked product was ground in a porcelain mortar and classified to give a size of 200 mesh or below. A set of such baking process and grounding process was repeated 3 times, thereby obtaining a composite material of $FeS_2$ and $IrS_2$ (iridium content: 10 wt %) as a cathode active material. A unit cell was prepared in the same manner as Example 1 by using this cathode active material.

Comparative Example 3

A composite material of $FeS_2$ and $TiS_2$ (titanium content: 10 wt %) as a cathode active material was obtained in the same manner as Comparative Example 2, except that titanium powders were used instead of iridium powders. A unit cell was prepared in the same manner as Example 1 by using this cathode active material.

Comparative Example 4

A composite material of $FeS_2$ and $VS_2$ (vanadium content: 10 wt %) as a cathode active material was obtained in the same manner as Comparative Example 2, except that vanadium powders were used instead of iridium powders. A unit cell was prepared in the same manner as Example 1 by using this cathode active material.

[Evaluation]

For the unit cells prepared as described above, the following evaluations were carried out.

A test cell was formed by sandwiching the unit cell by two hot plates whose temperatures were controllable. Then, a constant current discharge (end voltage: 0.4 V) was carried out for the test cell, to check the discharge voltage of the unit cell.

In the discharge test, the unit cell was heated by the hot plates to a temperature of 550° C., which is an average operating temperature for thermal batteries in which LiCl—KCl was used for the electrolyte. The voltage at the point when 10 seconds had passed was regarded as the discharge voltage. The current density was set to 0.5, 1.0, 1.5, and 2.0 A/cm².

The results of the discharge test are shown in Tables 1 to 6.

TABLE 6

| | Discharge Voltage (V) | | | |
|---|---|---|---|---|
| | 0.5 A/cm² | 1 A/cm² | 1.5 A/cm² | 2 A/cm² |
| Comp. Ex. 1 | 1.90 | 1.81 | 1.71 | 1.61 |
| Comp. Ex. 2 | 2.13 | 1.87 | 1.73 | 1.65 |
| Comp. Ex. 3 | 2.15 | 1.83 | 1.75 | 1.64 |
| Comp. Ex. 4 | 2.21 | 1.78 | 1.69 | 1.58 |

In the unit cells of Examples 1 to 7, in which $TiS_x$ was used for the cathode active material, the discharge voltage at a current density of 0.5 to 2 A/cm² exceeded 2 V, showing increased discharge voltages compared with the unit cells of Comparative Examples 1 to 4.

This is probably because the cathode active material of Examples 1 to 7, i.e., titanium-containing sulfide, has higher reactivity than the cathode active material including iron disulfide of Comparative Examples 1 to 4, in addition to a high equilibrium potential, and a small overpotential during discharge.

In the unit cells of Examples 2 and 7, in which x<1.5 or 2.75<x in $TiS_x$, the discharge voltage slightly decreased, since the cathode active material is not single phase. Based on such results, it is found that x is preferably 1.5 to 2.75.

In the unit cells in which α is >0 to 0.95, x is 1.5 to 2.75, and the element M is Cr, Mn, Co, Ni, Cu, Zn, Ge, Zr, Nb, Mo, Ag, Cd, Sn, or W in $Ti_{1-\alpha}M_\alpha S_x$ in the cathode active material, the discharge voltage at a current density of 0.5 to 2 A/cm² exceeded 2 V, showing a significant increase in the discharge voltage.

Among the unit cells, the unit cells of Examples 16 to 25 in which the element M is Co had a large discharge voltage, showing excellent discharge performance under high load.

This is probably because Co is easily diffused homogeneously in the solid phase of Ti, which improved homogeneity of the crystal, to easily bring out the effects of the substitution by the element M.

In the unit cells in which α is 0.98 in $Ti_{1-\alpha}M_\alpha S_x$ as the cathode active material, the higher discharge voltage was obtained compared with that of Comparative Examples 1 to 4 at current densities of 0.5 and 1.0 A/cm².

However, in the unit cells in which α is 0.98 in $Ti_{1-\alpha}M_\alpha S_x$, the lower discharge voltage was obtained at the large current of especially 1.5 to 2.0/cm² compared with that of the unit cells in which α is 0.95. This is probably due to the fact that although the effects, such as the increase of the discharge voltage, based on the substitution by element M were enhanced when α, the substitution amount of the element M, exceeds 0.95, more than such effect, the effects of the improvement of reactivity based on Ti became relatively less. Therefore, α representing the substitution amount of element M is preferably 0.95 or below.

Examples 70-74

A cathode active material was obtained in the same manner as Example 2, except that in $Ti_{1-\alpha}M_\alpha S_x$, element M, and the values of α and x were changed as shown in Table 7. Herein, two kinds of elements M (atomic ratio 1:1) were used in combination, as shown in Table 7. For example, the composition of a cathode active material of Example 70, in which Co and Cr were used for the element M, was $Ti_{0.5}Co_{0.25}Cr_{0.25}S_2$.

Unit cells were prepared in the same manner as Example 1 by using these cathode active materials, and the same discharge test as described above was carried out. The results are shown in Table 7.

TABLE 7

| Cathode Active Material: $Ti_{1-\alpha}M_\alpha S_x$ | | | Discharge Voltage (V) | | | |
|---|---|---|---|---|---|---|
| Element M | α | X | 0.5 A/cm² | 1 A/cm² | 1.5 A/cm² | 2 A/cm² |
| Ex. 70 | Co, Cr | 0.5 | 2 | 2.34 | 2.28 | 2.23 | 2.18 |
| Ex. 71 | Co, Mn | 0.5 | 2 | 2.29 | 2.26 | 2.23 | 2.20 |
| Ex. 72 | Co, Ni | 0.5 | 2 | 2.32 | 2.26 | 2.22 | 2.18 |
| Ex. 73 | Co, Cu | 0.5 | 2 | 2.33 | 2.28 | 2.24 | 2.20 |
| Ex. 74 | Co, Zn | 0.5 | 2 | 2.30 | 2.25 | 2.21 | 2.17 |

Table 7 shows that higher discharge voltages than that of the unit cells of Comparative Examples 1 to 4 were obtained in any discharge conditions even in the case when 2 kinds of the element M were used in combinations. In the unit cells of Examples 70 to 74, the discharge voltage at a current density of 0.5 to 2 A/cm² exceeded 2 V, showing increased discharge voltages compared with the unit cells of Comparative Examples 1 to 4.

The same effects with that of this Example can be obtained also when 2 or more elements from the group consisting of Cr, Mn, Co, Ni, Cu, Zn, Ge, Zr, Nb, Mo, Ag, Cd, Sn, and W were used in combination, other than the combinations of element M shown in this Example.

Examples 75-91

A thermal battery having the same structure with the above-described battery of FIG. 1 was prepared. The preparation of the thermal battery was all carried out in an environment of dry air with the dew point of −45° C. or below, where influences from moisture were eliminated to the maximum.

A unit cell 7 and a heating agent 5 were alternately stacked to form a power-generating portion. Herein, 13 unit cells 7 were used. For the heating agent 5, a mixture of Fe and $KClO_4$ was used, and a mixture ratio was adjusted so that the average temperature during the battery operation becomes 550° C.

An ignition pad 4 was disposed on top of the power-generating portion, and the side wall of the power-generating portion was covered by a fuse wrap 6. For the ignition pad 4 and the fuse wrap 6, a mixture of Zr, $BaCrO_4$, and a glass fiber was used.

For an ignition material for an igniter 3, a mixture in which potassium nitrate, sulfur, and carbon were mixed with a weight ratio of 75:10:15 was used. For thermal insulating materials 9a and 9b, a ceramic fiber material mainly composed of silica and alumina was used. The thermal battery with an operating temperature of 550° C. was thus prepared.

In preparation of the above thermal batteries, unit cells of Examples 1, 3, 6, 9, 13, 20, 27, 31, 35, 39, 43, 47, 51, 55, 59, 63, and 67 (where α is 0 or 0.5, x is 2, and M is Cr, Mn, Co, Ni, Cu, Zn, Ge, Zr, Nb, Mo, Ag, Cd, Sn, or W in $Ti_{1-\alpha}M_\alpha S_x$) were used to prepare thermal batteries of Examples 75 to 91, respectively.

Following discharge test was carried out for the thermal batteries thus obtained. A high voltage was applied from a power source connected to an ignition terminal to fire the igniter, thereby activating the thermal battery. Then, the thermal battery was discharged at a current density of 0.5 A/cm² (end voltage: 7.8 V) or of 2 A/cm² (end voltage: 6.5 V), and the voltage (discharge voltage) at the point when 10 seconds were passed from the start of the discharge was checked. As a result, it was revealed that a high discharge voltage equivalent to 13 unit cells in series was obtained.

Although the LiCl—KCl content was set to about 31 wt %, and the silica powder content was set to about 2 wt % in cathode in the above Example, there is no particular limitation with regard to the amount of these content, and necessary amounts may be added as appropriate according to the strength and performance of the cathode.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A thermal battery including a power-generating portion comprising a plurality of unit cells and heating agents for heating said unit cells that are alternately stacked, each unit cell comprising:
    a cathode,
    an anode, and
    an electrolyte disposed between said cathode and said anode, said electrolyte comprising a meltable salt capable of melting at a predetermined temperature, said thermal battery capable of operating at said predetermined temperature,
    wherein said cathode comprises a titanium-containing sulfide as an active material,
    wherein said titanium-containing sulfide is a compound represented by the general formula:

where M is at least one selected from the group consisting of Cr, Mn, Co, Ni, Cu, Zn, Ge, Mo, Ag, Cd, Sn, and W, and $\alpha$ and x satisfy $0.25 \leqq \alpha \leqq 0.75$ and $1.5 \leqq x \leqq 2.75$, respectively.

2. The thermal battery in accordance with claim 1, wherein x is 1.75 to 2.25 in the general formula.

3. The thermal battery in accordance with claim 1, wherein said heating agent includes an iron powder.

4. The thermal battery in accordance with claim 1, wherein said heating agent comprises a mixture of Fe and $KClO_4$.

5. The thermal battery in accordance with claim 1, wherein said electrolyte is in solid state at room temperature.

6. The thermal battery in accordance with claim 1, wherein M is Co.

7. The thermal battery in accordance with claim 6, wherein M further includes Cr, Mn, Ni, Cu, or Zn.

* * * * *